United States Patent
Nakano et al.

(10) Patent No.: US 9,324,158 B2
(45) Date of Patent: Apr. 26, 2016

(54) IMAGE PROCESSING DEVICE FOR PERFORMING IMAGE PROCESSING ON MOVING IMAGE

(71) Applicant: CASIO COMPUTER CO., LTD., Shibuya-ku, Tokyo (JP)

(72) Inventors: Kanako Nakano, Tokyo (JP); Koki Nakamura, Saitama (JP); Toshihiko Yoshida, Tokyo (JP); Kazuma Kawahara, Tokyo (JP); Jun Muraki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 150 days.

(21) Appl. No.: 14/028,272

(22) Filed: Sep. 16, 2013

(65) Prior Publication Data
US 2014/0079290 A1    Mar. 20, 2014

(30) Foreign Application Priority Data

Sep. 20, 2012    (JP) .................... 2012-207064

(51) Int. Cl.
| | |
|---|---|
| G06T 7/20 | (2006.01) |
| H04N 5/77 | (2006.01) |
| H04N 5/14 | (2006.01) |
| G06K 9/00 | (2006.01) |
| G09B 5/02 | (2006.01) |
| H04N 5/445 | (2011.01) |

(52) U.S. Cl.
CPC .............. *G06T 7/20* (2013.01); *G06K 9/00342* (2013.01); *G09B 5/02* (2013.01); *H04N 5/144* (2013.01); *H04N 5/772* (2013.01); *H04N 5/445* (2013.01)

(58) Field of Classification Search
None
See application file for complete search history.

(56) References Cited

U.S. PATENT DOCUMENTS

| | | | | |
|---|---|---|---|---|
| 5,111,410 A | * | 5/1992 | Nakayama ........... | A61B 5/1127 348/157 |
| 6,514,081 B1 | * | 2/2003 | Mengoli ............ | A63B 24/0003 434/252 |
| 7,227,893 B1 | * | 6/2007 | Srinivasa ........... | G06K 9/00771 348/155 |
| 7,266,771 B1 | * | 9/2007 | Tow .................. | G06F 17/30787 345/699 |
| 7,744,480 B2 | * | 6/2010 | Gobush .............. | A63B 24/0003 473/150 |
| 8,363,900 B2 | | 1/2013 | Huang | |
| 2002/0064764 A1 | * | 5/2002 | Fishman .............. | A63B 24/003 434/252 |

(Continued)

FOREIGN PATENT DOCUMENTS

| | | |
|---|---|---|
| JP | 2002346012 A | 12/2002 |
| JP | 2003-117045 A | 4/2003 |
| JP | 2006181014 A | 7/2006 |
| JP | 2008-242965 A | 10/2008 |
| JP | 2008-287177 A | 11/2008 |
| JP | 2009-200713 A | 9/2009 |
| JP | 2011205657 A | 10/2011 |

OTHER PUBLICATIONS

Japanese Office Action dated Oct. 21, 2014, issued in counterpart Japanese Application No. 2012-207064.
Korean Office Action dated Jan. 20, 2015, issued in counterpart Korean Application No. 10-2013-0111852.

*Primary Examiner* — Tsung-Yin Tsai
(74) *Attorney, Agent, or Firm* — Holtz, Holtz & Volek PC

(57) ABSTRACT

An image processing device executes: a determination process of determining similarity of a motion of a subject in each of a plurality of pieces of moving image data stored in the storing unit; a selection process of selecting a specific piece of moving image data from among the pieces of moving image data on the basis of the similarity determined by the determination step; and an output process of outputting information of a selection result by the selection step.

12 Claims, 11 Drawing Sheets

(56) References Cited

U.S. PATENT DOCUMENTS

| | | | |
|---|---|---|---|
| 2002/0098898 A1* | 7/2002 | Manwaring | A63B 24/0003 473/151 |
| 2008/0144964 A1* | 6/2008 | Soinio | G06T 5/006 382/275 |
| 2009/0270204 A1* | 10/2009 | Saegusa | A63B 24/0003 473/409 |
| 2011/0060738 A1* | 3/2011 | Gates | G06F 17/30749 707/737 |
| 2011/0170741 A1* | 7/2011 | Hasegawa | H04N 1/00132 382/103 |
| 2011/0228320 A1* | 9/2011 | Hasegawa | H04N 1/00442 358/1.15 |
| 2014/0185867 A1* | 7/2014 | Ishikawa | G06K 9/00342 382/103 |

* cited by examiner

IMAGE PROCESSING DEVICE FOR PERFORMING IMAGE PROCESSING ON MOVING IMAGE

This application is based on and claims the benefit of priority from Japanese Patent Application No. 2012-207064, filed on 20 Sep. 2012, the content of which is incorporated herein by reference.

BACKGROUND OF THE INVENTION

1. Field of the Invention

The present invention relates to an image processing device, an image processing method, and a storage medium storing a program for performing predetermined image processing on a moving image.

2. Related Art

A technique for simultaneously replaying a plurality of moving images on one screen in a divisional manner has been conventionally known (for example, see Japanese Patent Application Laid-open Publication No. 2003-117045 and Japanese Patent Application Laid-open Publication No. 2008-242965).

In this case, a GUI (Graphical User Interface) for allowing a user to select the target to be replayed from among the moving images is used. In the conventional GUI as above, pieces of information that can specify the moving images (such as thumbnail images or file names) are displayed in a manner that pieces of information are sorted according to the date or the file name.

SUMMARY OF THE INVENTION

An aspect of the present invention is
an image processing device including a storage unit, a CPU, and an output unit, wherein
the storage unit stores a plurality of pieces of moving image data;
the CPU executes
a determination process of determining the similarity of a motion of a subject in each of the plurality of pieces of moving image data stored in the storage unit, and
a selection process of selecting a specific piece of moving image data from among the plurality of pieces of moving image data on the basis of the similarity determined by the determination process; and
the output unit
outputs information of a selection result by the selection process.

Another aspect of the present invention is
an image processing method including:
a determination step of determining the similarity of a motion of a subject in each of a plurality of pieces of moving image data;
a selection step of selecting a specific moving image data from among the pieces of moving image data on the basis of the similarity determined by the determination step; and an output step of outputting information of a selection result by the selection step.

Another aspect of the present invention is
a non-transitory storage medium storing a program,
the program having a computer execute:
a determination process of determining the similarity of a motion of a subject in each of a plurality of pieces of moving image data;
a selection process of selecting a specific piece of moving image data from among the pieces of moving image data on the basis of the similarity determined by the determination process; and
an output process of outputting information of a selection result by the selection process.

DETAILED DESCRIPTION OF THE INVENTION

Embodiments of the present invention are hereinafter described with reference to the drawings.

First Embodiment

Figure 1:
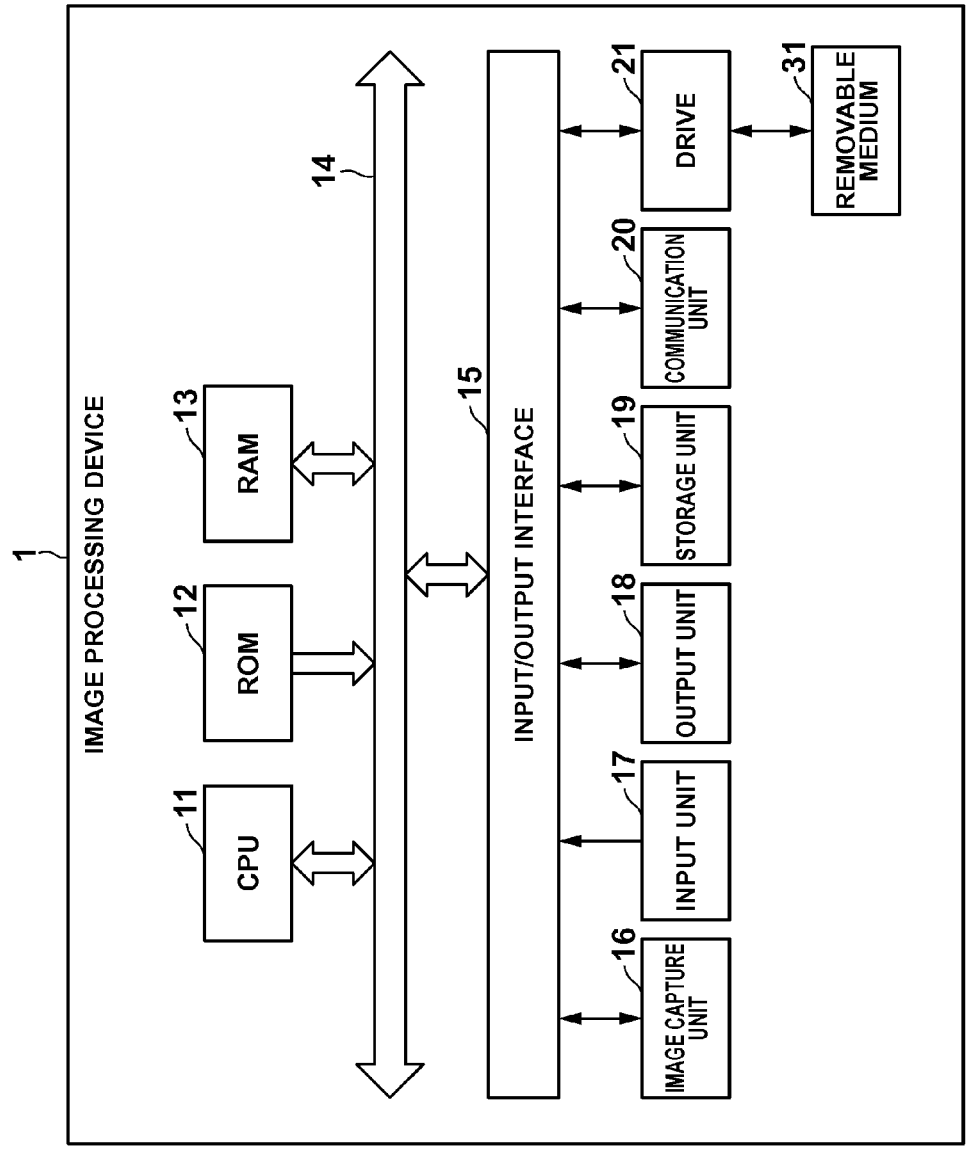
FIG. 1 is a block diagram of a hardware configuration of an image processing device according to a first embodiment of the present invention.

FIG. 1 is a block diagram depicting a hardware configuration of an image processing device 1 according to a first embodiment of the present invention.

The image processing device 1 is configured as, for example, a digital camera.

The image processing device 1 includes a CPU (Central Processing Unit) 11, ROM (Read Only Memory) 12, RAM (Random Access Memory) 13, a bus 14, an input/output interface 15, an image capture unit 16, an input unit 17, an output unit 18, a storage unit 19, a communication unit 20, and a drive 21.

The CPU 11 executes various processes in accordance with a program stored in the ROM 12 or a program loaded from the storage unit 19 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the input unit 17, the output unit 18, the storage unit 19, the communication unit 20, and the drive 21 are connected to the input/output interface 15.

The image capture unit 16 includes an optical lens unit and an image sensor, which are not illustrated.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of a captured image". Data of a captured image is supplied to the CPU 11, and the like as appropriate.

The input unit 17 is configured by various buttons and the like, and inputs a variety of information in accordance with instruction operations by the user.

The output unit 18 is configured by the display unit, a speaker, and the like, and outputs images and sound.

The storage unit 19 is configured by DRAM (Dynamic Random Access Memory) or the like, and stores data of various images.

The communication unit 20 controls communication with other devices (not shown) via networks including the Internet.

A removable medium 31 composed of a magnetic disk, an optical disk, a magneto-optical disk, semiconductor memory or the like is installed in the drive 21, as appropriate. Programs that are read via the drive 21 from the removable medium 31 are installed in the storage unit 19, as necessary. Similarly to the storage unit 19, the removable medium 31 can also store a variety of data such as the image data stored in the storage unit 19.

Figure 2:
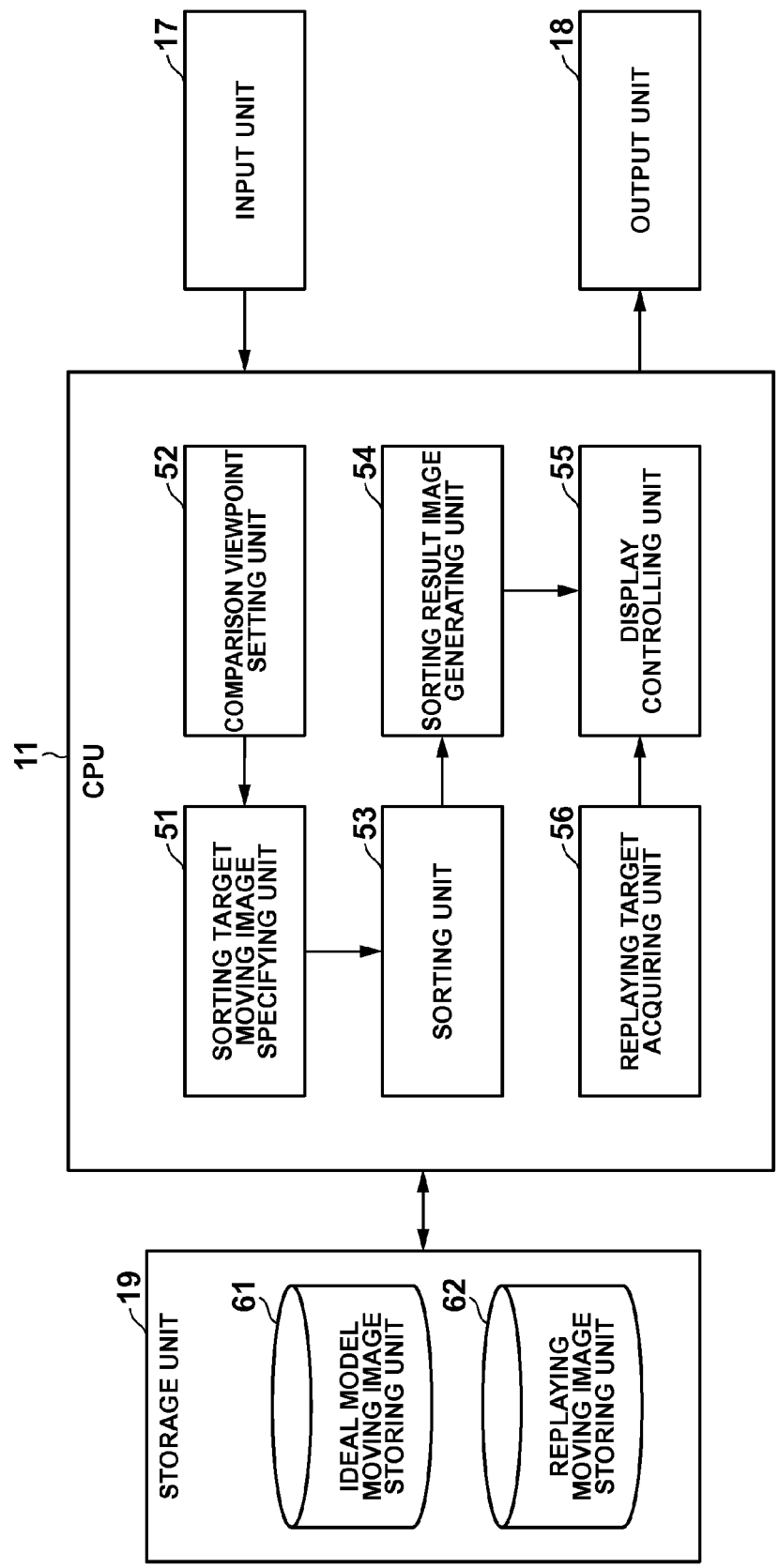
FIG. 2 is a function block diagram of a function structure of the image processing device of FIG. 1 for executing a moving image replaying process.

FIG. 2 is a function block diagram depicting a function structure of the image processing device 1 for executing the moving image replaying process.

Here, the moving image replaying process refers to a series of processes as follows.

In this embodiment, a moving image including a golf swing motion of a predetermined person (here, a user of the image processing device 1 for simplifying the description) corresponds to a target to be replayed. Such a moving image is hereinafter referred to as "replaying target moving image."

In this embodiment, not just the replaying target moving image but also a moving image including an ideal golf swing of, for example, a professional golfer (hereinafter called "ideal model moving image") as a moving image to be compared with the replaying target moving image correspond to a display target. In this embodiment, the replaying target moving image and the ideal model moving image are simultaneously replayed on double screens of the output unit 18.

A user generally makes progress in the golf swing by repeatedly practicing the golf swing. Here, the repetition of the golf swing motions may correspond to the repetition in continuous time (for example, repetition in one practice) or repetition in separated time (for example, repetition of once-in-a-week practice). Therefore, there may be multiple candidates for the replaying target moving image. In this case, the user often desires the candidate most similar to the ideal model, i.e., the candidate in which the user did the best golf swing as the replaying target moving image.

Therefore, it would be convenient for the user to visually check which candidate is the most similar to the ideal model moving image (without actually replaying the moving image) before the user selects the replaying target moving image from among the multiple candidates.

In view of this, in this embodiment, the image processing device 1 sorts the multiple candidates for the replaying target moving image on the basis of the similarity of the golf swing motion to the ideal model moving image, and outputs to display the image representing the sorting result (hereinafter referred to as "sorting result image") on the output unit 18. Such a process is hereinafter referred to as "replaying target moving image sorting and displaying process".

"The moving image replaying process" herein corresponds to a series of processes of the image processing device 1, the processes including: displaying the sorting result image by executing the replaying target moving image sorting and displaying process; allowing the user having visually checked the sorting result image to select the replaying target moving image; and simultaneously replaying the replaying target moving image and the ideal model moving image on the double screens.

In the execution of the moving image replaying process, as depicted in FIG. 2, a sorting target moving image specifying unit 51, a comparison viewpoint setting unit 52, a sorting unit 53, a sorting result image generating unit 54, a display controlling unit 55, and a replaying target acquiring unit 56 function in the CPU 11.

A region of the storage unit 19 is provided with an ideal model moving image storing unit 61 and a replaying moving image storing unit 62.

The ideal model moving image storing unit 61 stores the data of a plurality of candidates for the ideal model moving image in advance, and also stores the analysis results obtained in advance by analyzing the swing motions of an ideal model (for example, a professional golfer) for every piece of data of the candidates. A method of the analysis is not particularly limited; however, the same method as that employed for analyzing the data of the candidates for the replaying target moving image by the sorting target moving image specifying unit 51, which is later described, is used.

The replaying moving image storing unit 62 stores a plurality of data of the candidates for the replaying target moving images. As the data of the candidates for the replaying target moving image, the data of photographed images taken in the past with predetermined photographing devices including devices other than the image processing device 1, or the data of photographed images taken with the image processing device 1 just before may be used. As the data of the candidates for the replaying target moving image, the data of a plurality of photographed images taken successively in time, or the data of a plurality of photographed images taken at time intervals may be used.

Based on the manipulation of the input unit 17 by the user, the sorting target moving image specifying unit 51 specifies the ideal model moving image to be used as the reference from among a plurality of candidates for the ideal model moving image stored as the data in the ideal model moving image storing unit 61.

Next, based on the similarity between the ideal model moving image and the motion of a subject (here, the golf swing motion), the sorting target moving image specifying unit 51 specifies the moving image to be the target of a predetermined process from among the plurality of candidates for the replaying target moving image stored as the data in the replaying moving image storing unit 62. In this embodiment, the sorting process is employed as the predetermined process as later described; therefore, the moving image to be sorted (hereinafter referred to as "sorting target moving image") is specified.

Here, the sorting target moving image specifying unit 51 analyzes each piece of the data of the candidates for the replaying target moving image for determining the similarity between each of those candidates and the ideal model moving image in accordance with the similar method to that used for analyzing the data of the ideal model moving image.

A method of the analysis is not limited in particular; for example, the method as follows can be used.

A moving image is constituted by a plurality of images each corresponding to one shot of a film, such as a frame or a field. Since the image such as a frame or a field is often used as the unit of image processing, the image is hereinafter referred to as "unit image".

In this case, the sorting target moving image specifying unit 51 can employ a method of detecting the subject from a predetermined unit image for every plural candidates, and analyzing the motion of the subject (here, the motion of the golf swing).

Alternatively, the sorting target moving image specifying unit 51 can employ a method of analyzing a series of flows for a specific motion (here, the golf swing motion) commonly performed by the subject in the plural moving images.

The comparison viewpoint setting unit 52 sets a predetermined comparison viewpoint used for determining the similarity between the motion of the subject and the ideal model moving image, and notifies the result to the sorting target moving image specifying unit 51.

In other words, the sorting target moving image specifying unit 51 determines the similarity between the motion of the subject in the ideal model moving image (here, the golf swing of the ideal model) and the motion of the subject in each of the candidates for the replaying target moving image (here, the golf swing of the user for each time) on the basis of the predetermined comparison viewpoint. Then, from among the plural candidates for the replaying target moving image, the sorting target moving image specifying unit 51 specifies one or more sorting target moving images as the target of the predetermined process (here, sorting) on the basis of the similarity from the predetermined comparison viewpoint.

Here, a specific example of the predetermined comparison viewpoint is described with reference to FIG. 3 to FIG. 5.

Figure 3:
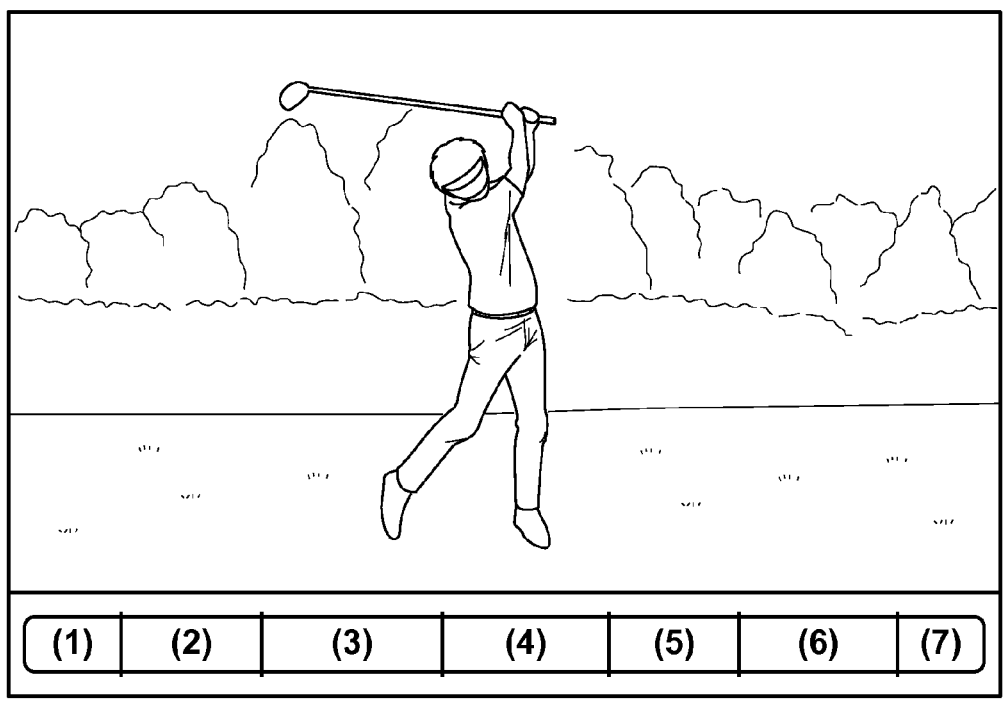
FIG. 3 is a schematic diagram for describing an example of employing the speed of a golf swing motion (positional change) or the change in speed as a comparison viewpoint in the image processing device of FIG. 2.

FIG. 3 is a schematic diagram for describing an example in which any of various kinds of information to be analyzed in a series of motions of the golf swing, such as the change of the position, the angle, the direction, the distance, or the speed at a plurality of motion timings is employed as the comparison viewpoint. The specific example of FIG. 3 shows the change in speed of a clubhead from the backswing to the follow swing. The speed of the clubhead at the impact point can also be regarded as the positional change over the plural motion timings before and after the impact point.

Figure 4:
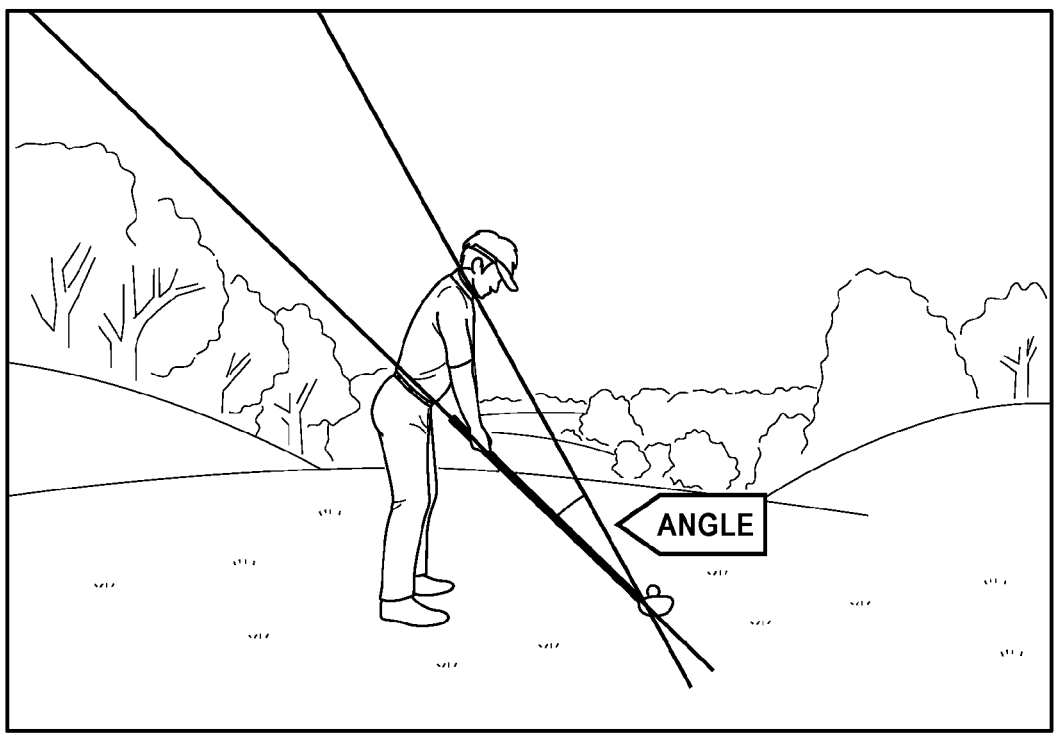
FIG. 4 is a schematic diagram for describing an example of employing the direction of the golf swing in a still state, specifically the degree of body inclination, as the comparison viewpoint in the image processing device of FIG. 2.

FIG. 4 is a schematic diagram for describing an example in which any of various kinds of information to be analyzed in a still state of the golf swing, such as the position, the angle, the direction, and the distance in the still state is employed as the comparison viewpoint. The specific example of FIG. 4 shows the degree of the body inclination in the address.

Figure 5:
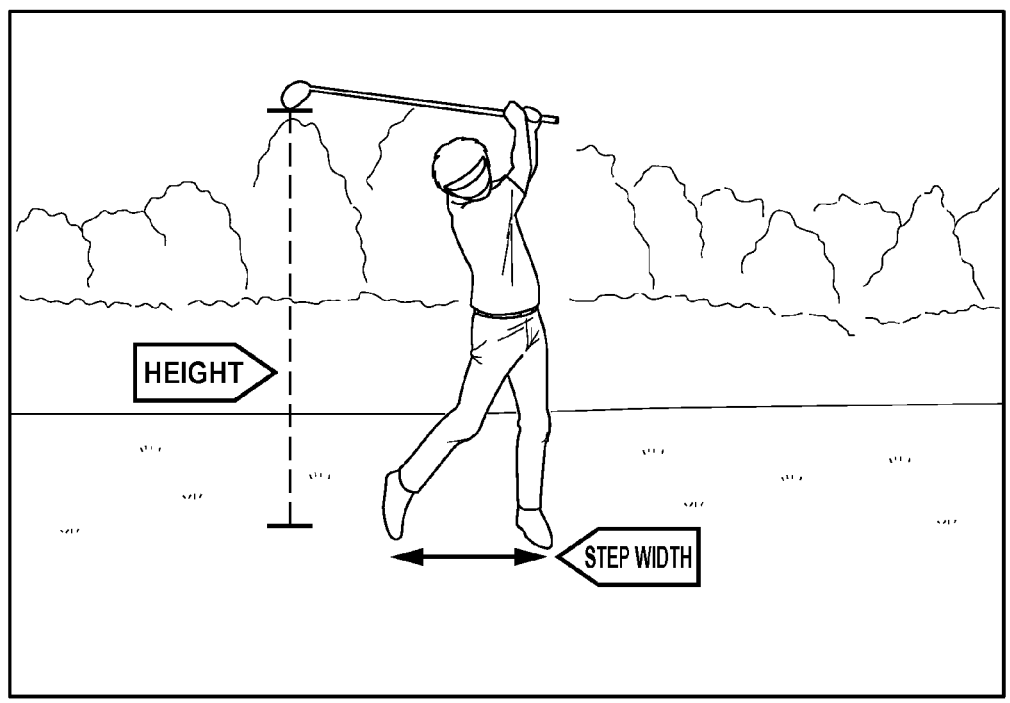
FIG. 5 is a schematic diagram for describing an example of employing the position of the golf swing motion as the comparison viewpoint in the image processing device of FIG. 2.

FIG. 5 is a schematic diagram for describing an example in which any of various kinds of information to be analyzed in a series of golf swing motions, such as the position, the angle, the direction, and the distance at a specific motion timing is employed as the comparison viewpoint. The specific example of FIG. 5 shows the height of the clubhead and the step width at the follow swing.

In the example of FIG. 3, from the comparison viewpoint of the motion speed of the golf swing (positional change) or the change in speed, the candidates for the replaying target moving image are compared with the ideal model moving image. In other words, based on the viewpoint of the similarity of the motion speed of the golf swing to the ideal model, the plural sorting target moving images are specified and sorted as later described.

In this case, the comparison can also be made based on the average speed of a series of motions in the golf swing from the backswing to the follow swing.

In this embodiment, a series of motions from the backswing to the follow swing is sectioned into a plurality of checkpoints (periods) including top, impact, and follow points. More specifically, in the example of FIG. 3, the motions are sectioned into seven checkpoints denoted by circled numbers. This makes it possible to compare the speed at every checkpoint. Specifically, by synchronously replaying the ideal model moving image and the replaying target moving image in the checkpoint specified by the user, the user can compare the moving images while visually checking the differences between the user himself and the ideal model on the motion speed of the swing in the checkpoint.

The plural sorting target moving images can be specified and sorted as later described, on the basis of the viewpoint of the similarity of the motion speed of the golf swing to the ideal model using each of these checkpoints as a unit.

Note that FIG. 3 depicts just one example of the various information to be analyzed in a series of golf swing motions, and the changes in position, angle, direction, distance, speed, etc. at the plurality of motion timings may be compared with those of the ideal model.

In the following description, however, for simplifying the description, attention is paid on "the motion speed of the golf swing" if the comparison viewpoint of the example of FIG. 3 is used. In other words, the process, etc. expressed as "the motion speed of the golf swing (positional change) or the change in speed" similarly apply to the case of employing various kinds of information to be analyzed in a series of golf swing motions, such as the change in position, angle, direction, distance, and speed at the plural motion timings.

In the example of FIG. 4, the candidates for the replaying target moving image are compared with the ideal model moving image from the comparison viewpoint of the direction of the golf swing in the still state, specifically the degree of body inclination. In other words, from the viewpoint of similarity to the degree of the body inclination of the ideal model, the plural sorting target moving images are specified and sorted as later described.

For example, in this embodiment, the angle between a straight line approximately parallel to the club from the center of the clubhead and a straight line to the shoulder of the subject from the clubhead (hereinafter referred to as "body inclination angle") is employed as the degree of the body inclination. In other words, in this embodiment, the body inclination angle detected from the replaying target moving image and the body inclination angle detected from the ideal model moving image are compared to achieve the comparison between the degree of the body inclination as the direction of the golf swing in the still state.

Then, from the viewpoint of similarity to the body inclination angle of the ideal model, the plural sorting target moving images can be also specified and sorted as later described.

FIG. 4 depicts just one example of the various kinds of information to be analyzed in the still state of the golf swing, and alternatively, the comparison may be made on the position, angle, direction, distance, etc. in the still state with those of the ideal model.

In the following description, however, for simplifying the description, attention is paid on "the direction of the golf swing in the still state" if the comparison viewpoint of the example of FIG. 4 is used. In other words, the process, etc. expressed as "the direction of the golf swing in the still state" similarly apply to the case of employing various kinds of information to be analyzed in the golf swing in the still state, such as the position, the angle, the direction, and the distance, in the still state.

In the example of FIG. 5, the candidates for the replaying target moving image are compared with the ideal model moving image from the comparison viewpoint of the position of the golf swing motion, specifically at least one of the step width and the swing position (height up to the clubhead). In other words, from the viewpoint of the similarity between at least one of the step width and the swing position (height up to the clubhead) and that of the ideal model, the plural sorting target moving images are specified and sorted as later described.

Note that FIG. 5 depicts just one example of the various information to be analyzed in a series of golf swing motions, and the position, angle, direction, distance, etc. at a specific motion timing may be compared with those of the ideal model.

In the following description, however, for simplifying the description, attention is paid on "the position of the golf swing motion" if the comparison viewpoint of the example of FIG. 5 is used. In other words, the process, etc. expressed as "position of the golf swing motion" similarly apply to the case of employing various kinds of information to be analyzed in a series of the golf swing motions, such as the position, the angle, the direction, and the distance at a specific motion timing.

Back to FIG. 2, the sorting unit 53 sorts the plural sorting target moving images specified by the sorting target moving image specifying unit 51 on the basis of the similarity to the ideal model moving image from the comparison viewpoint set by the comparison viewpoint setting unit 52.

Here, the sorting of the plural sorting target moving images is performed based on the similarity to the ideal model moving image from the predetermined comparison viewpoint. Therefore, the predetermined comparison viewpoint can be regarded as a sorting condition on the plural sorting target moving images.

For example, if the sorting condition (comparison viewpoint) is the motion speed of the golf swing (positional change) or the change in speed in the example of FIG. 3, the plural sorting target moving images are sorted in the order of high similarity to the motion speed of the golf swing (positional change) or the change in speed of the ideal model moving image.

For example, if the sorting condition (comparison viewpoint) is the direction of the golf swing in the still state, specifically the degree of the body inclination in the example of FIG. 4, the plural sorting target moving images are sorted in the order of high similarity to the degree of the body inclination (body inclination angle of FIG. 4) of the ideal model moving image.

For example, if the sorting condition (comparison viewpoint) is position of the golf swing motion, specifically the step width or the swing position (height up to the clubhead) in the example of FIG. 5, the plural sorting target moving images are sorted in the order of high similarity to the step width or the swing position (height up to the clubhead) of the ideal model moving image.

The sorting result image generation unit 54 generates the data of the sorting result image representing the result of the sorting unit 53.

The display control unit 55 controls to display the sorting result image on the output unit 18.

Figure 6:
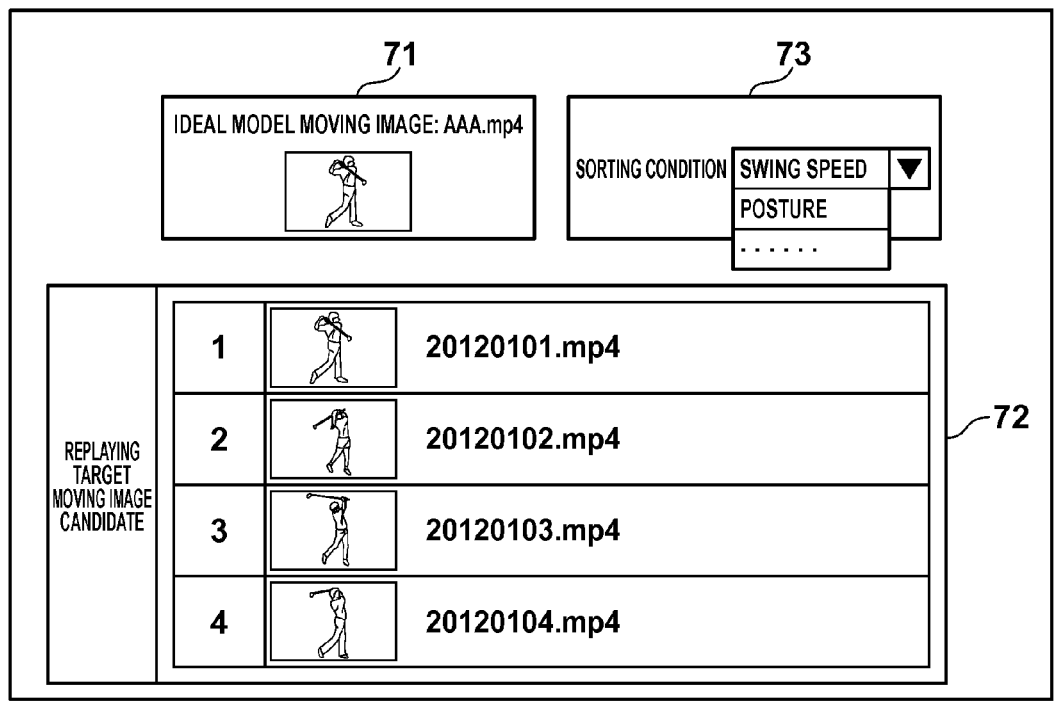
FIG. 6 is a diagram depicting an example of a sorting result image to be displayed by the image processing device of FIG. 2.

FIG. 6 is a diagram depicting an example of the sorting result image.

In the example of FIG. 6, the sorting result image includes an ideal model moving image display region 71, a replaying target moving image candidate display region 72, and a sorting condition display region 73.

The ideal model moving image display region 71 displays information capable of specifying the ideal model moving image (here, the file name and thumbnail image).

In the replaying target moving image candidate display region 72, information capable of specifying the plural sorting target moving images, i.e., the plural candidates for the replaying target moving image (here, the file names and thumbnail images) are displayed from the top in the order of the sorting result of the sorting unit 53.

Further, the user can select a desired one of the plural candidates for the replaying target moving image displayed in the replaying target moving image candidate display region 72 (information capable of specifying the candidate) as the replaying target moving image by manipulating the input unit 17 (FIG. 1).

In this case, the plural candidates for the replaying target moving image (information capable of specifying the candidates) are displayed from the top in the order of sorting under a predetermined sorting condition (displayed in the sorting condition display region 73 as later described). In other words, a plurality of candidates for the replaying target moving image (information capable of specifying the candidates) are displayed in the order of high similarity to the ideal model moving image (information capable of specifying the ideal model moving image is displayed in the ideal model moving image display region 71) under the sorting condition (comparison viewpoint).

Therefore, the user can appropriately select the candidate of the replaying target moving image (information capable of specifying the candidate) similar to the ideal model moving image as the replaying target moving image by merely performing simple manipulation of selecting the displayed candidates in order from the top.

In the sorting condition display region 73, the sorting condition currently selected is displayed and moreover a plurality of selectable sorting conditions is also displayed as a pull-down menu as depicted in FIG. 6.

Therefore, the user can select a desired sorting condition from the pull-down menu by manipulating the input unit 17 (FIG. 1). This selection result is fed back to the sorting unit 53, and the plural sorting target moving images (plural candidates for the replaying target moving image) are re-sorted according to the sorting condition. Then, the sorting result image generating unit 54 generates (updates) the data of the sorting image representing the re-sorting result and under the control by the display control unit 55, the updated sorting result image is displayed on the output unit 18. In other words, the display order of the plural candidates for the replaying target moving image (information capable of specifying the candidates) in the replaying target moving image candidate display region 72 is updated according to the re-sorting result.

Back to FIG. 2, the replaying target acquiring unit 56 acquires from the replaying moving image storing unit 62, the data of the moving image selected by the user as the replaying target moving image in the sorting result image, and acquires from the ideal model moving image storing unit 61, the data of the ideal model moving image.

The display control unit 55 controls to display the replaying target moving image and the ideal model moving image on double screens simultaneously on the output unit 18.

Next, the moving image replaying process executed by the image processing device 1 with the function structure of FIG. 2 is described with reference to FIG. 7.

Figure 7:
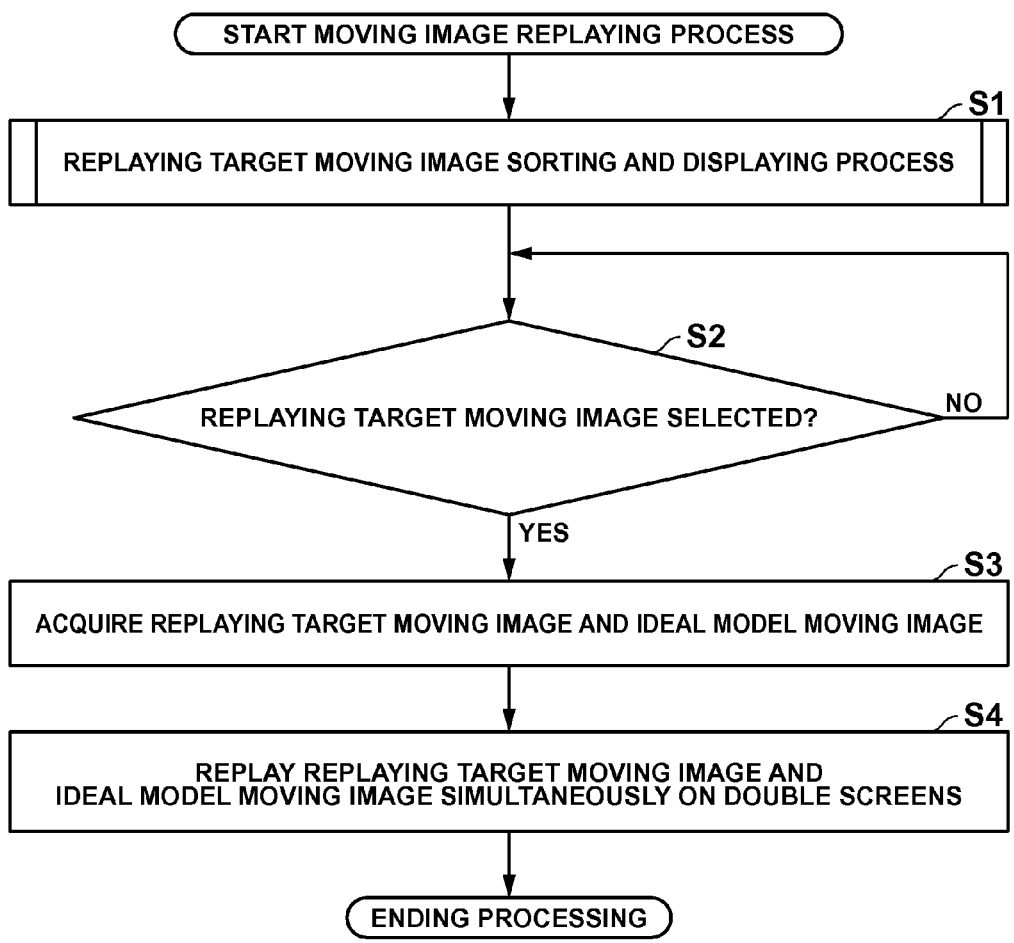
FIG. 7 is a diagram for describing a moving image replaying process to be executed in the image processing device 1 with the function structure of FIG. 2.

FIG. 7 is a flowchart for describing the flow of the moving image replaying process.

In this embodiment, the moving image replaying process is triggered by the selection of a double-screen replaying mode as the replaying mode of the image processing device 1.

In Step S1, the sorting unit 53, etc. execute the replaying target moving image sorting and displaying process, so that the plural candidates for the replaying target moving image are sorted based on the similarity to the golf swing motion of the ideal model moving image, and the sorting result image (see FIG. 6) representing the sorting result is displayed on the output unit 18.

The details of the replaying target moving image sorting and displaying process are later described with reference to FIG. 8.

In Step S2, the replaying target acquiring unit 56 determines whether the replaying target moving image has been selected or not.

If the replaying target moving image is not yet selected, NO is determined in Step S2 and the process returns to Step S2. In other words, until the replaying target moving image is selected, the determination process of Step S2 is repeated and the moving image replaying process is in a standby state.

After the replaying target moving image is selected, YES is determined in Step S2 and the process advances to Step S3.

In Step S3, the replaying target acquiring unit 56 acquires the data of the replaying target moving image selected by the user in the process of Step S2 from the replaying moving image storing unit 62 and acquires the data of the ideal model moving image from the ideal model moving image storing unit 61.

In Step S4, the display control unit 55 replays and displays the replaying target moving image and the ideal model moving image on double screens simultaneously on the output unit 18.

Thus, the moving image replaying process ends.

Next, the details of the replaying target moving image sorting and displaying process of Step S1 in the first embodiment out of such a moving image replaying process are described.

Figure 8:
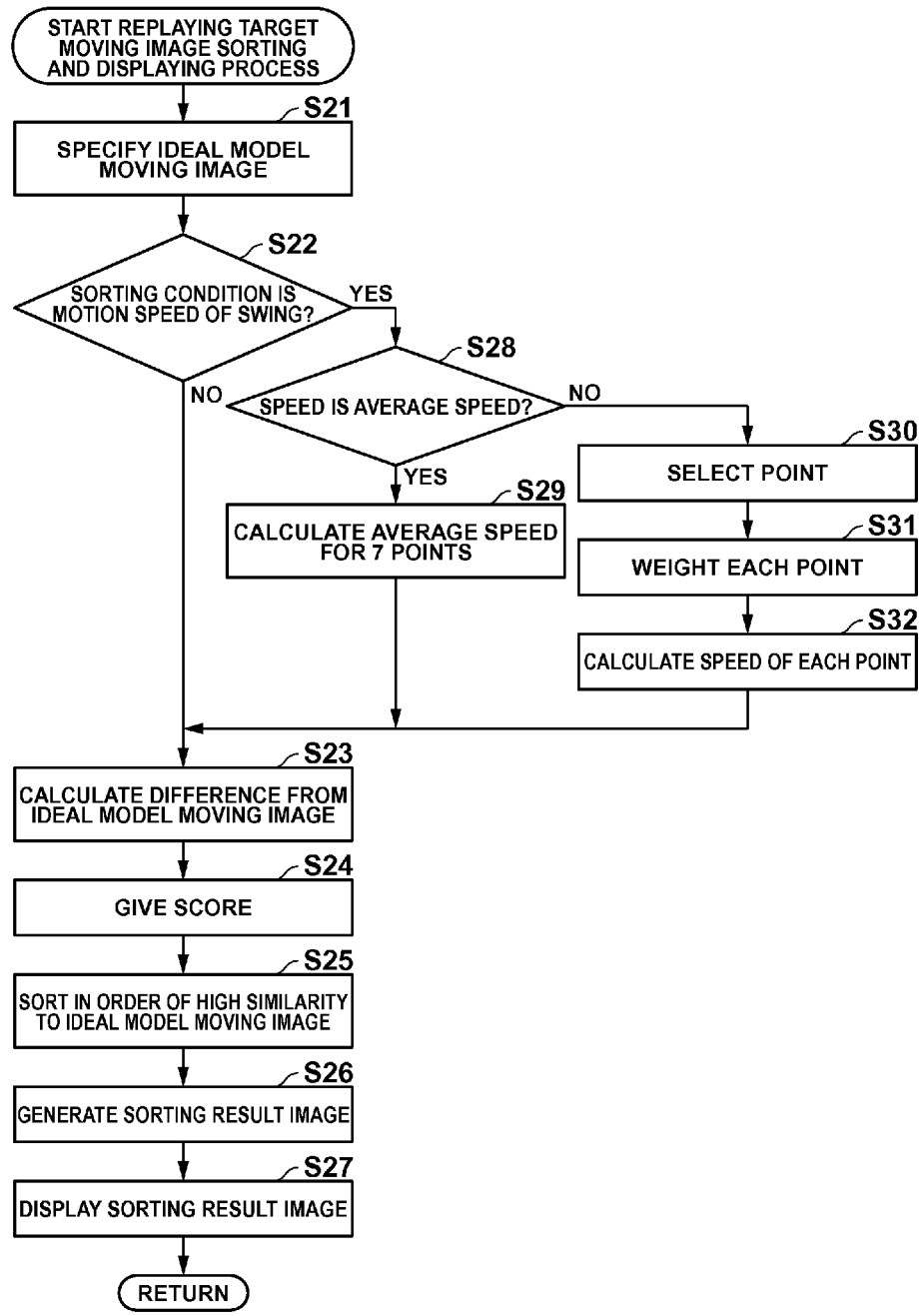
FIG. 8 is a flowchart for describing the details of a replaying target moving image sorting and displaying process according to the first embodiment in the moving image replaying process of FIG. 7.

FIG. 8 is a flowchart for describing the details of the replaying target moving image sorting and displaying process of Step S1 out of the moving image replaying process of FIG. 7.

In the example of FIG. 8, the motion speed of the golf swing (positional change), the change in speed (see FIG. 3), the direction of the golf swing in the still state (degree of body inclination, see FIG. 4), or the position of the golf swing motion (step width and swing position (height up to the clubhead), see FIG. 5) is preset as the sorting condition in advance.

In Step S21, the sorting target moving image specifying unit 51 specifies (selects) the ideal model moving image to be used as the reference from among the plural candidates for the ideal model moving image stored in the ideal model moving image storing unit 61 on the basis of the manipulation of the user on the input unit 17.

In Step S22, the sorting target moving image specifying unit 51 determines whether or not the sorting condition is the motion speed of the golf swing (positional change) or the change in speed.

If the sorting condition is neither the motion speed of the golf swing (positional change) nor the change in speed, i.e., if the sorting condition is the direction of the golf swing in the still state (degree of body inclination, see FIG. 4) or the position of the golf swing motion (step width and swing position (height up to the clubhead), see FIG. 5), NO is determined in Step S22 and the process advances to Step S23.

In Step S23, the sorting target moving image specifying unit 51 calculates the difference between the ideal model moving image and each of the candidates for the replaying target moving image in the sorting condition, thereby specifying (selecting) the sorting target moving image from among the plural candidates for the replaying target moving image stored in the replaying moving image storing unit 62.

In other words, the difference between the ideal model moving image and each of the candidates for the replaying target moving image in the sorting condition represents the similarity (or its index value) between the motion of the subject (here, the golf swing motion) and that of the ideal model in the predetermined comparison viewpoint (sorting condition). That is, as the difference is smaller, the similarity is determined to be higher; meanwhile, as the difference is larger, the similarity is determined to be lower.

For example, if the sorting condition (comparison viewpoint) is the direction of the golf swing in the still state, specifically the degree of the body inclination in the example of FIG. 4, the difference is calculated on the degree of the body inclination (body inclination angle of FIG. 4).

As another example, if the sorting condition (comparison viewpoint) is the position of the golf swing motion, specifically the step width or the swing position (height up to the clubhead) in the example of FIG. 5, the difference is calculated on the step width or the swing position (height up to the clubhead).

In Step S24, the sorting target moving image specifying unit 51 gives the score representing the similarity to the ideal model moving image on the basis of the difference calculated in the process of Step S23. The score is higher as closer to the ideal model moving image (as the similarity is higher).

The sorting target moving image specifying unit 51 specifies the sorting target moving image from among the plural candidates for the replaying target moving image on the basis of the score.

If the sorting result image can be displayed with the thumbnail, etc., the sorting target moving image specifying unit 51 can specify all of the candidates for the replaying target moving image as the sorting target moving image.

In Step S25, the sorting unit 53 sorts the sorting target moving images in the order of higher similarity to the ideal model moving image, i.e., higher score obtained in the process of Step S24.

In Step S26, the sorting result image generating unit 54 generates the data of the sorting result image representing the result of Step S25.

In Step S27, the display control unit 55 causes the output unit 18 to display the sorting result image.

Thus, the replaying target moving image sorting and displaying process ends, i.e., the process of Step S1 in FIG. 7 ends, and the process advances to Step S2.

The description has been made of the replaying target moving image sorting and displaying process in the case where the sorting condition is neither the motion speed of the golf swing (positional change) nor the change in speed, i.e., the sorting condition is the direction of the golf swing in the still state (degree of body inclination, see FIG. 4) or the position of the golf swing motion (step width and swing position (height up to the club height), see FIG. 5).

Next, the replaying target moving image sorting and displaying process in the case where the sorting condition is the motion speed of the golf swing (positional change) or the change in speed will be described. In this case, YES is determined in Step S22 and the process advances to Step S28.

In Step S28, the sorting target moving image specifying unit 51 determines whether or not the average speed is set as the speed of the sorting condition.

If the average speed is set as the speed of the sorting condition, YES is determined in Step S28 and the process advances to Step S29.

In Step S29, the sorting target moving image specifying unit 51 calculates the average speed for seven points (seven checkpoints shown by circled number in FIG. 3) on each of the plural candidates for the replaying target moving image.

Thus, the process advances to Step S23. In this case, the difference among the average speeds of the seven points is calculated in the process of Step S23, and a series of processes subsequent thereto as above is executed.

On the contrary, if the average speed is not set as the speed of the sorting condition, i.e., if the speed at each checkpoint is set, NO is determined in Step S28 and the process advances to Step S30.

In Step S30, the sorting target moving image specifying unit 51 selects the point of the target to be compared with the ideal model moving image from among the seven points (seven checkpoints shown by circled numbers in FIG. 3). A method of this selection is not particularly limited; the selection by a user with the manipulation of the input unit 17 or the automatic selection based on a predetermined algorithm may be applied.

In Step S31, the sorting target moving image specifying unit 51 weights each point selected in the process of Step S30. A method of weighting is not particularly limited; the setting by a user with the manipulation of the input unit 17 or the automatic setting based on a predetermined algorithm may be applied.

In Step S32, the sorting target moving image specifying unit 51 calculates the speed of each point selected in the process of Step S30.

Thus, the process advances to Step S23. In this case, the difference in speed between the respective points is calculated in the process of Step S23, and the process of Step S24 as below is executed, for example.

In Step S24, the sorting target moving image specifying unit 51 gives the score representing the similarity to the ideal model moving image for every plural candidates for the replaying target moving image on the basis of the difference calculated for each point in the process of Step S23 and of the weight set for each point in the process of Step S31.

Specifically, the product of the weight and the difference is obtained for each point in one replaying target moving image, and the accumulated additional value, the average value, etc. of each product obtained for each point is given as the score of the replaying target moving image.

If at least one point is far away from the ideal model moving image so that the similarity as a whole is assumed to be low, the weight may be multiplied by, accumulatively added to, or averaged relative to the value obtained by squaring the difference of each point.

After that, a series of processes subsequent to Step S25 described above is executed.

The description has been made of the first embodiment. Next, a second embodiment will be described.

Second Embodiment

The image processing device 1 according to a second embodiment can have a basically similar hardware configuration to that of the first embodiment. Therefore, FIG. 1 is also a block diagram of a hardware configuration of the image processing device 1 according to the second embodiment.

The image processing device 1 according to the second embodiment can have a basically similar function structure to that of the first embodiment. Therefore, FIG. 2 is also a function block diagram depicting a function structure of the image processing device 1 according to the second embodiment.

The outline of the flow of the moving image replaying process to be executed by the image processing device 1 according to the second embodiment is basically similar to that of the first embodiment. Therefore, FIG. 7 is also a flowchart for describing the flow of the moving image replaying process to be executed by the image processing device 1 according to the second embodiment.

However, in the replaying target moving image replaying process of Step S1 in the moving image replaying process, only one kind selected by the user is considered as the predetermined comparison viewpoint (sorting condition) used for obtaining the similarity to the ideal model moving image in the first embodiment as above. Therefore, in the first embodiment, the replaying target moving image replaying process in Step S1 follows the flow of the flowchart of FIG. 8.

In contrast, in the second embodiment, a combination of a plurality of kinds is considered as the predetermined comparison viewpoint (sorting condition) used for obtaining the similarity to the ideal model moving image.

This makes it possible to satisfy a variety of requests of users, specifically a request of making a comparison from a first viewpoint and moreover a second viewpoint, or a request of making an overall comparison from the first viewpoint and the second viewpoint.

Figure 9:
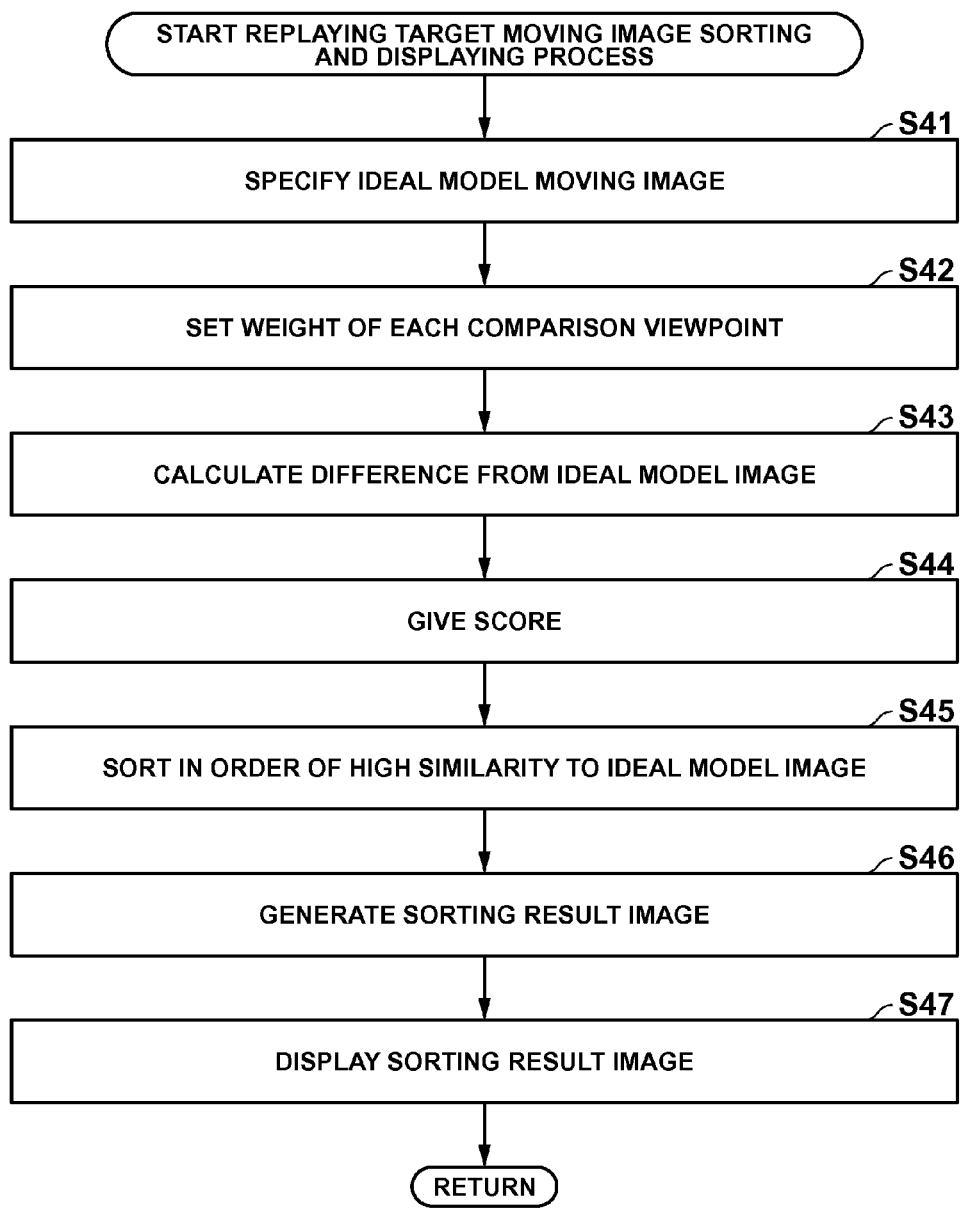
FIG. 9 is a flowchart for describing the details of a replaying target moving image sorting and displaying process according to a second embodiment in the moving image replaying process of FIG. 7.

FIG. 9 is a flowchart for describing the details of the replaying target moving image sorting and displaying process of Step S1 in the second embodiment out of the moving image replaying process of FIG. 7.

In the example of FIG. 9, a combination of two or more kinds selected from among the motion speed of the golf swing (positional change), the change in speed (see FIG. 3), the direction of the golf swing in the still state (degree of body inclination, see FIG. 4), the position of the golf swing motion (step width and swing position (height up to the club height), see FIG. 5), etc. is preset as the sorting condition in advance.

In Step S41, the sorting target moving image specifying unit 51 specifies the ideal model moving image to be used as the reference from among the plural candidates for the ideal model moving image stored in the ideal model moving image storing unit 61 on the basis of the manipulation of the input unit 17 by the user.

In Step S42, the sorting target moving image specifying unit 51 sets the weight of each comparison viewpoint (each sorting condition).

A method of setting the weight is not particularly limited; a method of setting based on the manipulation of the input unit 17 by the user or a method of setting automatically based on a predetermined algorithm may be applied.

Here, "0" is set as the weight of the unset viewpoint of the plurality of kinds of comparison viewpoints (sorting conditions).

In Step S43, the sorting target moving image specifying unit 51 calculates each difference between the ideal model moving image and each of the plural candidates for the replaying target moving image in each of the sorting conditions, thereby specifying the sorting target moving image from among the plural candidates for the replaying target moving image stored in the replaying moving image storing unit 62.

In Step S44, the sorting target moving image specifying unit 51 gives the score representing the similarity to the ideal model moving image for each of the plural candidates for the replaying target moving image on the basis of the difference calculated for each of the plural kinds of the sorting conditions in the process of Step S43 and of the weight set for each of the plural kinds of sorting conditions in the process of Step S42.

Specifically, for example, the product of the weight and the difference is calculated for each of the plural kinds of the sorting conditions on one replaying target moving image, and the accumulated additional value of each product obtained for each of the sorting conditions is given as the score of the replaying target moving image.

Then, the sorting target moving image specifying unit 51 specifies the sorting target moving image from among the plural candidates for the replaying target moving image on the basis of the score.

If the sorting result image can be displayed with the thumbnail, etc., the sorting target moving image specifying unit 51 may specify all of the candidates for the replaying target moving image as the sorting target moving image.

In Step S45, the sorting unit 53 sorts the sorting target moving images in the order of higher similarity to the ideal model moving image, i.e., the higher score given in the process of Step S44.

In Step S46, the sorting result image generating unit 54 generates the data of the sorting result image representing the result of Step S45.

In Step S47, the display control unit 55 causes the output unit 18 to display the sorting result image.

Thus, the replaying target moving image sorting and displaying process ends, i.e., the process of Step S1 of FIG. 7 ends and the process advances to Step S2.

The description has been made of the second embodiment. Next, a third embodiment will be described.

Third Embodiment

The image processing device 1 according to a third embodiment can have a basically similar hardware configuration to that of the first embodiment or the second embodiment. Therefore, FIG. 1 is also a block diagram of a hardware configuration of the image processing device 1 according to the third embodiment.

The image processing device 1 according to the third embodiment can have a basically similar function structure to that of the first embodiment or the second embodiment. Therefore, FIG. 2 is also a function block diagram depicting a function structure of the image processing device 1 according to the third embodiment.

The outline of the flow of the moving image replaying process to be executed by the image processing device 1 according to the third embodiment is basically similar to that of the first embodiment or the second embodiment. Therefore, FIG. 7 is also a flowchart for describing the flow of the moving image replaying process to be executed by the image processing device 1 according to the third embodiment.

In the replaying target moving image replaying process of Step S1 of the moving image replaying process, in the second embodiment as above, the combination of a plurality of kinds is considered as the predetermined comparison viewpoint (sorting condition) used for obtaining the similarity to the ideal model moving image and the obtained similarity is taken as the overall similarity (as a score) in the sorting process, etc.

In contrast, although this third embodiment is similar to the second embodiment up to the point in which the combination of a plurality of kinds is considered as the predetermined comparison viewpoints (sorting conditions) for obtaining the similarity to the ideal model moving image, the third embodiment is different from the second embodiment in that the similarity is exhibited by coordinates of points representing the candidates for the replaying target moving image distributed in a space formed using each kind of the comparison viewpoints as an axis.

This makes it possible for the user to flexibly select the replaying target moving image while mutually considering the comparison viewpoints, for example, select while emphasizing a second viewpoint relative to a first viewpoint or select while considering the first viewpoint and the second viewpoint evenly.

Figure 10:
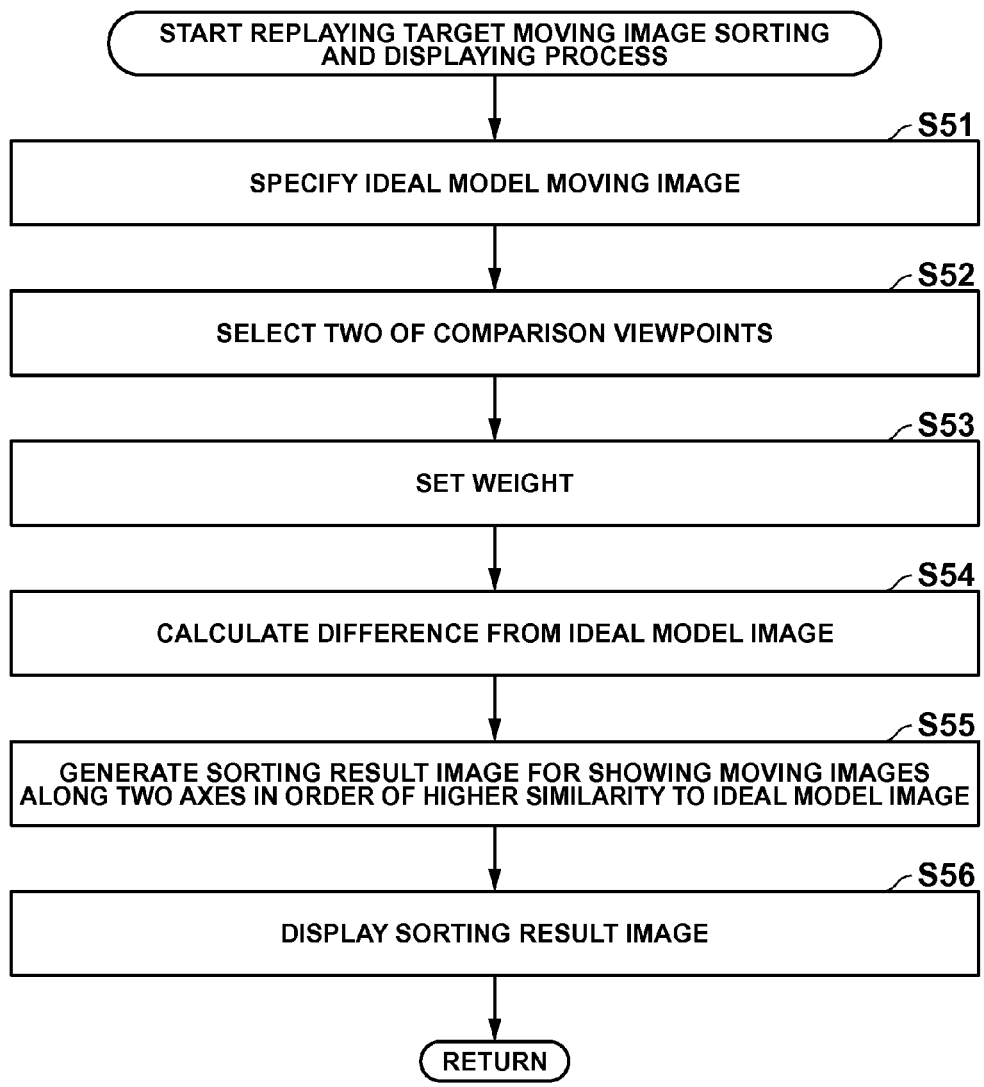
FIG. 10 is a flowchart for describing the details of a replaying target moving image sorting and displaying process according to a third embodiment in the moving image replaying process of FIG. 7.

FIG. 10 is a flowchart for describing the details of the replaying target moving image sorting and displaying process of Step S1 in the third embodiment out of the moving image replaying process of FIG. 7.

In the example of FIG. 10, a combination of a plurality of kinds selected from among the motion speed of the golf swing (positional change), the change in speed (see FIG. 3), the direction of the golf swing in the still state (degree of body inclination, see FIG. 4), the position of the golf swing motion (step width and swing position (height up to the clubhead), see FIG. 5), etc. is preset as the sorting condition in advance.

In Step S51, the sorting target moving image specifying unit 51 specifies the ideal model moving image to be used as the reference from among the plural candidates for the ideal model moving image stored in the ideal model moving image storing unit 61 on the basis of the manipulation of the input unit 17 by the user.

In Step S52, the sorting target moving image specifying unit 51 selects two kinds from the comparison viewpoints (sorting conditions).

A method of setting the two kinds of comparison viewpoints is not particularly limited; a method of setting based on the manipulation of the input unit 17 by the user or a method of setting automatically based on a predetermined algorithm may be applied.

In Step S53, the sorting target moving image specifying unit 51 sets the weight of the two kinds of comparison viewpoints (sorting conditions) selected in the process of Step S52.

A method of setting the weight is not particularly limited; a method of setting based on the manipulation of the input unit 17 by the user or a method of setting automatically based on a predetermined algorithm may be applied.

In Step S54, the sorting target moving image specifying unit 51 calculates the difference between the ideal model moving image and each of the plural candidates for the replaying target moving image in each of the two sorting conditions selected in the process of Step S52, thereby specifying the sorting target moving image from among the plural candidates for the replaying target moving image stored in the replaying moving image storing unit 62.

Here, the sorting target moving image specifying unit 51 may calculate the simple difference; however, in this embodiment, the difference utilizing the weight set in the process of Step S53, for example, the product of the weight and the simple difference is calculated.

Then, the sorting target moving image specifying unit 51 specifies the sorting target moving image from among the plural candidates for the replaying target moving image on the basis of the difference.

If the sorting result image can be displayed with the thumbnail, etc., all of the candidates for the replaying target moving image may be specified as the sorting target moving image.

In Step S55, the sorting unit 53 sorts the sorting target moving images in the order of higher similarity to the ideal model moving image along the two axes (i.e., obtaining each coordinate along the two axes), and the sorting result image generating unit 54 generates the data of the sorting result image in which the sorting target moving images are displayed along the two axes in the order of higher similarity to the ideal model moving image.

Here, the similarity to the ideal model moving image is exhibited according to the distance from the origin in a two-dimensional space (plane) defined by the two axes. In other words, as the coordinate is closer to the origin, the approximation to the ideal model moving image is higher (similarity is higher).

In Step S56, the display control unit 55 causes the output unit 18 to display the sorting result image.

Thus, the replaying target moving image sorting and displaying process ends, i.e., the process of Step S1 of FIG. 7 ends and the process advances to Step S2.

Figure 11:
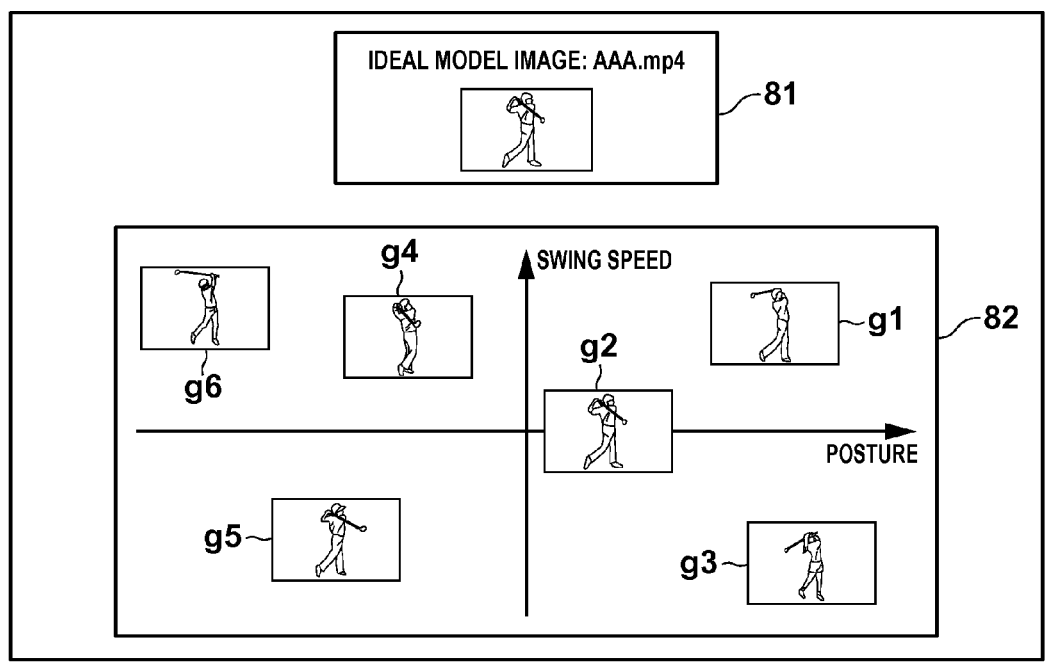
FIG. 11 is a diagram depicting an example of a sorting result image to be displayed by the image processing device of FIG. 2, which is different from the example of FIG. 6.

FIG. 11 is a diagram depicting one example of the sorting result image shown along the two axes.

In the example of FIG. 11, the sorting result image includes an ideal model moving image display region 81, and a replaying target moving image candidate two-axis display region 82.

In the ideal model moving image display region 81, information capable of specifying the ideal model moving image (here, the thumbnail image) is displayed.

In the replaying target moving image candidate two-axis display region 82, pieces of information capable of specifying the plural sorting target moving images, i.e., the plural candidates for the replaying target moving image (here, the thumbnail images) are displayed while being distributed on a plane using the two kinds of sorting conditions (comparison viewpoints) as axes.

Specifically, in the example of FIG. 11, the motion speed of the golf swing (positional change) or the change in speed (see FIG. 3) is set along the vertical axis (axis of swing speed) and the direction of the golf swing in the still state (degree of body inclination, see FIG. 4) is set along the horizontal axis (axis of posture).

The origin corresponds to a point at which the replaying target moving image coincides with the ideal model moving image (the information capable of specifying the ideal model moving image is displayed in the ideal model moving image displaying region 81) based on the viewpoint of the motion speed of the golf swing (positional change) or the change in speed and the direction of the golf swing in the still state (degree of body inclination). As the coordinate is closer to the origin in the horizontal direction (right-left direction), the replaying target moving image is more approximate (similar) to the ideal model moving image from the viewpoint of the direction of the golf swing in the still state (degree of body inclination). Meanwhile, as the coordinate is closer to the origin in the vertical direction (up-down direction), the replaying target moving image is more approximate (similar) to the ideal model moving image from the viewpoint of the motion speed of the golf swing (positional change) or the change in speed.

For example, among thumbnail images representing the candidates for the replaying target moving image (hereinafter, candidate images) g1 to g6, the candidate image g2 (moving image corresponding to the candidate image g2) is closest to the origin; therefore, it is understood that this moving image is the most approximate (similar) to the ideal model moving image from the viewpoints of the motion speed of the golf swing (positional change) or the change in speed and the direction of the golf swing in the still state (degree of body inclination). More specifically, the candidate image g2 (moving image corresponding to the candidate image g2) has a coordinate of approximately 0 in the vertical-axis direction; therefore, it is understood that the moving image coincides with the ideal model moving image from the viewpoint of the motion speed of the golf swing (positional change) or the change in speed.

In contrast, the candidate images g3 and g6 (moving images corresponding to the candidate images g3 and g6) are far from the origin; therefore, it is understood that the moving images are far from (not similar to) the ideal model moving image from the viewpoints of the motion speed of the golf swing (positional change) or the change in speed and the direction of the golf swing in the still state (degree of body inclination).

The user can select a desired one of the plural candidate images g1 to g6 displayed in the replaying target moving image candidate two-axis display region 82 in the sorting result image as the replaying target moving image.

In this case, the user can select the candidate for the replaying target moving image (information capable of specifying the candidate) similar to the ideal model moving image as the replaying target moving image as appropriate by a simple manipulation of selecting based on the distance from the origin. Further, the user can perform the visual and intuitive selection; for example, from among the viewpoints of the motion speed of the golf swing (positional change) or the change in speed and the direction of the golf swing in the still state (degree of body inclination), the user can focus on the distance from the origin along the vertical axis if the user wants to put priority to the former and focus on the distance from the origin along the horizontal axis if the user wants to put priority to the latter.

Thus, the description has been made of the embodiments of the present invention in the order of the first to third embodiments.

Note that the present invention is not limited to the first to third embodiments as above, and modifications, improvements, etc. of the embodiment in the range of achieving the present invention are included in the present invention.

For example, the image processing device having a function as below is included in the present invention.

The image processing device can have a specifying function of specifying a moving image as a target of a predetermined process from among a plurality of moving images on the basis of the similarity of the motion of the subject in the plurality of moving images.

The predetermined process may be any process; for example, a process of sorting the moving images in the order of higher similarity to a reference moving image can be employed.

In other words, in this case, the specifying function of the image processing device includes: specifying a reference moving image to be used as a reference (for example, an ideal model moving image), and specifying a moving image as a target of a predetermined process based on the similarity, more specifically the sorting process, from among the moving images on the basis of the similarity between the motion of a subject in the reference moving image and the motion of the subject in the moving images.

Thus, in the case of simultaneously replaying the moving image as a comparing target and moving image to be compared, the plural candidates for the moving image as the comparing target are sorted while being specified based on the similarity of the motion of the subject therein; therefore, the user can easily select the similar moving image to be compared (the reference moving image such as ideal model moving image).

In other words, it is possible to easily select the moving image as a target of the predetermined process such as comparison with motion from among the plural moving images of the subject with motion.

In the image processing device, the predetermined comparison viewpoint may include a plurality of viewpoints out of the motion speed, motion direction, motion timing, motion position, and motion state about the subject.

The predetermined comparison viewpoint may include the viewpoint of change in state of the subject concerning various kinds of information to be analyzed in a series of motions of the subject, the information including the position, the angle, the direction, the distance, and the speed at a plurality of motion timings.

The predetermined comparison viewpoint may include the viewpoint of the state of the subject concerning various kinds of information to be analyzed in a series of motions of the subject at a specific motion timing. The state of the subject may include the position, the angle, the direction, or the distance about the subject.

Thus, the similarity of the motion of the subject in the plural moving images can be obtained based on various viewpoints of the motion of the subject.

In the image processing device, a plurality of kinds of viewpoints is given as the predetermined viewpoints and the specifying function can select one or more kinds from among the plurality of kinds as the predetermined comparison viewpoints.

Here, the plurality of kinds of comparison viewpoints that is selectable may include a plurality of viewpoints from among the following viewpoints: the viewpoint of change in state of the subject concerning various kinds of information to be analyzed in a series of motions of the subject, the information including the position, the angle, the direction, the distance, and the speed at a plurality of motion timings; the viewpoint of the state of the subject concerning various kinds of information to be analyzed in a series of motions of the subject at a specific motion timing; and the viewpoint of the state of the subject in a still state concerning various kinds of information to be analyzed in the still state of the subject. The state of the subject at the specific motion timing and the state of the subject in the still state may include the position, the angle, the direction, or the distance about the subject.

This makes it possible to obtain the similarity of the motion of the subject in each of the plural moving images from various viewpoints on the motion of the subject. In particular, by allowing the user to select the viewpoint through the manipulation, the similarity of the motion of the subject in each of the plural moving images can be obtained from the desired viewpoint of the user. As a result, the user can easily select the moving image similar to the moving image to be compared (the reference moving image such as the ideal moving image) from the desired viewpoint.

The specifying function of the image processing device can include the function of, for every plural moving images, detecting the subject from a predetermined unit image, analyzing the motion of the subject further, and specifying the moving image to be the target of the predetermined process from among the moving images on the basis of the similarity of the motion of the subject analyzed for every plural moving images.

This makes it possible to obtain the similarity of the motion of the subject analyzed for every plural moving images on the basis of the appropriate analysis result. Accordingly, the user can select the appropriate moving image similar to the moving image to be compared (the reference moving image such as the ideal model moving image).

The specifying function of the image processing device can further include the function of analyzing the flow of a series of motions in the specific motion commonly performed by the subject in the plural moving images, and calculating the similarity of the motion of the subject in each of the plural moving images on the basis of the analysis result.

This makes it possible to obtain the similarity of the motion of the subject analyzed for every plural moving images on the basis of the appropriate analysis result on a series of motions. As a result, the user can select the appropriate moving image similar to the moving image to be compared (the reference moving image such as the ideal model moving image).

The specifying function of the image processing device can include the function of calculating the similarity of the motion of the subject in each of the plural moving images by comparing the plurality of checkpoints in the flow of the series of motions from the predetermined comparison viewpoint.

This makes it possible to obtain the similarity of the motion of the subject in each of the moving images on the important point, etc. in the series of motions of the subject closely. As a result, the user can select easily the moving image similar to the moving image to be compared (the reference moving image such as the ideal model moving image) at the important point.

Here, for example, the specific motion corresponds to the golf swing, and the comparison is made on the plurality of checkpoints including the top, impact, and follow points in the series of motions from the backswing to the follow swing from the predetermined comparison viewpoint, so that the aforementioned effect becomes more remarkable.

Concerning the checkpoints, the similarity of the motion of the subject in each of the moving images may be calculated by converting the result of comparison from the predetermined comparison viewpoint into numerals and adding a predetermined weight to the numerals.

This makes it possible to appropriately obtain the overall similarity of the motion of the subject in each of the moving images in accordance with the importance of the plural points. As a result, the user can select easily and appropriately the moving image similar to the moving image to be compared (the reference moving image such as the ideal model moving image) on the series of motions.

The image processing device can further have an execution function of executing the predetermined process and a display control function of executing the control for displaying an image representing an execution result of an execution unit.

This makes it possible for the user to easily and visually check the execution result of the execution unit through the image. Here, if the predetermined process is the sorting process as above, the sorting result image representing the sorting result is displayed. As a result, the user can select more easily the moving image similar to the moving image to be compared (the reference moving image such as the ideal model moving image) by visually checking the sorting result image.

The execution function of the image processing device may include a function of forming a space including a plurality of axes corresponding to the plurality of viewpoints, and distributing the plural moving images in the space on the basis of the similarity of the motion of the subject in each of the moving images, thereby sorting the moving images. The display control function of the image processing device may include the function of executing the control for displaying the image representing the moving images distributed in the space.

This makes it possible for the user to perform the easy and intuitive multi-faceted selection of the moving image similar to the moving image to be compared (the reference moving image such as the ideal model moving image); for example, the user can select based on each face of the plural comparison viewpoints (select the moving image which is similar to the ideal moving image in a viewpoint but not similar in another viewpoint), select based on an overall face (select the moving image which is generally similar to the ideal model moving image).

In this case, the execution function can further select the viewpoints to be assigned along a plurality of axes. By accepting this selection through the user manipulation, the comparison viewpoint desired by the user is assigned to the desired axis; therefore, the user can select the moving image similar to the moving image to be compared (the reference moving image such as the ideal model moving image) more easily and appropriately.

The execution function can further include a function of forming a space with the position corresponding to the reference moving image as the origin, determining positions for disposing the moving images on the basis of the similarity between the reference moving image and the motion of the subject in each of the moving images, and distributing the moving images at the respective positions, thereby sorting the plural moving images.

This makes it possible for the user to visually check the similarity between the moving image and the moving image to be compared (the reference moving image such as the ideal model moving image) based on the distance from the origin to the disposing position of the moving image intuitively and immediately. Therefore, the user can select the moving image similar to the moving image to be compared (the reference moving image such as the ideal model moving image) more easily and appropriately.

The image processing device may additionally have an acquiring function of acquiring the data of the moving images for synchronous replay, and the display control function may have a function of synchronously replaying the moving images and displaying these moving images on the screen side by side.

This makes it possible for the user to visually check the moving image as the comparing target (replaying target moving image) and the moving image to be compared (the reference moving image such as the ideal model moving image) while comparing the images at the same time.

In the above embodiment, the image processing device 1 to which the present invention is applied is a digital camera; however, the present invention is not particularly limited thereto.

For example, the present invention can be applied to general electronic appliances with a display control function. More specifically, for example, the present invention can be applied to a lap-top personal computer, a printer, a television, a video camera, a portable navigation device, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image processing device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 19 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

What is claimed is:

1. An image processing device comprising a storage unit, a CPU, and an output unit, wherein:
   the storage unit stores a plurality of pieces of moving image data;
   the CPU executes:
      a determination process of determining a similarity, with respect to a predetermined comparison viewpoint, of a motion of a subject in each of the plurality of pieces of moving image data stored in the storage unit; and
      a selection process of selecting a specific piece of moving image data from among the plurality of pieces of moving image data based on the similarity determined by the determination process;
   the output unit outputs information of a selection result by the selection process;
   the predetermined comparison viewpoint includes a plurality of comparison viewpoints from among (i) a first comparison viewpoint of a change in a state of the subject concerning various kinds of information to be analyzed in a series of motions of the subject at a plurality of motion timings, (ii) a second comparison viewpoint of the state of the subject concerning various kinds of information to be analyzed in a series of motions of the subject at a specific motion timing, and (iii) a third comparison viewpoint of the state of the subject in a still state concerning various kinds of information to be analyzed in the still state of the subject; and
   the determination process determines a final similarity of the motion of the subject based on an overall result of determinations regarding the similarity determined with respect to each of the plurality of comparison viewpoints.

2. The image processing device according to claim 1, wherein the predetermined comparison viewpoint with respect to which the similarity is determined is a viewpoint with respect to at least one of a motion speed, a motion direction, a motion timing, a motion position, and a motion state of the subject.

3. The image processing device according to claim 1, wherein for the first comparison viewpoint, the various kinds of information to be analyzed in the series of motions of the subject include a position, an angle, a direction, a distance, and a speed at the plurality of motion timings.

4. The image processing device according to claim 1, wherein for the second comparison viewpoint, the various kinds of information to be analyzed in the series of motions of the subject at the specific motion timing include one of a position, an angle, a direction, and a distance about the subject.

5. The image processing device according to claim 1, wherein for the third comparison viewpoint, the various kinds of information to be analyzed in the still state of the subject include one of a position, an angle, a direction, and a distance about the subject.

6. The image processing device according to claim 1, wherein the CPU further executes an analysis process of detecting the subject from a predetermined unit image and analyzing the motion of the subject in the plurality of pieces of moving image data; and
   wherein in the determination process, the CPU determines the similarity of the motion of the subject analyzed by the analysis process for each of the plurality of pieces of moving image data.

7. The image processing device according to claim 6, wherein:
   in the analysis process, the CPU analyzes a flow of a series of motions in a specific motion commonly performed by the subject in the plurality of pieces of moving data, and
   in the determination process, the CPU calculates the similarity of the motion of the subject in each of the plurality of pieces of moving image data based on the analysis result of the analysis process.

8. The image processing device according to claim 7, wherein in the determination process, the CPU calculates the similarity of the motion of the subject in each of the plurality of pieces of moving image data by comparing a plurality of checkpoints in the flow of the series of motions with respect to the predetermined comparison viewpoint.

9. The image processing device according to claim 8, wherein:
   the specific motion is golf swing; and
   in the determination process, the CPU compares the plurality of checkpoints including top, impact, and follow points in the series of motions of the golf swing from backswing to follow swing with respect to the predetermined comparison viewpoint.

10. The image processing device according to claim 8, wherein in the determination process, the CPU converts a result of comparing the plurality of checkpoints into numerals and adding a predetermined weight to the respective numerals, thereby calculating the similarity of the motion of the subject in each of the plurality of pieces of moving image data.

11. An image processing device comprising a storage unit, a CPU, and an output unit, wherein:
   the storage unit stores a plurality of pieces of moving image data;
   the CPU executes:
      a determination process of determining a similarity, with respect to a predetermined comparison viewpoint, of a motion of a subject in each of the plurality of pieces of moving image data stored in the storage unit; and
      a selection process of selecting a specific piece of moving image data from among the plurality of pieces of moving image data based on the similarity determined by the determination process;
   the output unit outputs information of a selection result by the selection process;
   the predetermined comparison viewpoint includes a plurality of comparison viewpoints;
   in the selection process, the CPU forms a multidimensional space defined by a plurality of axes respectively corresponding to the plurality of comparison viewpoints, and based on the similarity of the motion of the subject in each of the moving images determined with respect to the plurality of comparison viewpoints, distributes the moving images in the multidimensional space, thereby sorting the moving images; and the output unit outputs images representing the moving images distributed in the multidimensional space.

12. The image processing device according to claim 11, wherein in the selection process, the CPU further selects one of the plurality of comparison viewpoints to be assigned along a respective one of the plurality of axes.

* * * * *